(12) United States Patent
Onayama (10) Patent No.: US 6,466,526 B1
(45) Date of Patent: Oct. 15, 2002

(54) APPARATUS FOR RECORDING AND REPLAYING INFORMATION ON OPTICAL INFORMATION RECORD MEDIUM AND OPTICAL PICKUP

(75) Inventor: Syuuichi Onayama, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/453,388

(22) Filed: Dec. 2, 1999

(30) Foreign Application Priority Data

Dec. 8, 1998 (JP) .......................................... 10-348989

(51) Int. Cl.⁷ ................................................ G11B 7/00
(52) U.S. Cl. ................................. 369/44.23; 369/112.12
(58) Field of Search ........................... 369/44.23, 44.37, 369/44.41, 112.05–112.15

(56) References Cited

U.S. PATENT DOCUMENTS

| | | | | |
|---|---|---|---|---|
| 4,935,911 A | * | 6/1990 | Ohuchida et al. | 369/13 |
| 4,970,710 A | * | 11/1990 | Lee | 369/44.23 |
| 5,195,072 A | * | 3/1993 | Fukui et al. | 369/44.23 |
| 5,315,574 A | | 5/1994 | Saimi et al. | 369/109 |
| 5,404,344 A | | 4/1995 | Imada et al. | 369/44.14 |
| 5,652,744 A | * | 7/1997 | Freeman et al. | 369/112.1 |
| 5,777,971 A | * | 7/1998 | Choi | 369/44.23 |

FOREIGN PATENT DOCUMENTS

| | | |
|---|---|---|
| JP | 06-068541 | 3/1994 |
| WO | WO 96/28816 | 9/1996 |

* cited by examiner

Primary Examiner—Thang V. Tran
(74) Attorney, Agent, or Firm—Hayes Soloway P.C.

(57) ABSTRACT

An apparatus for recording and replaying information on optical information record medium comprises: a light source for radiating a light beam to an information-bearing layer of the optical information record medium; a hologram device for splitting reflected light from the optical information record medium, the hologram device comprising a central region formed at the central area thereof and a hologram grating surface region arranged at the outer periphery of the central region; a photoreceptor device for receiving split light beams from the hologram device, the photoreceptor device comprising a first multiple-part split photoreceptor element for receiving light beams from the central region and two second multiple-part split photoreceptor elements for receiving light beams from the hologram grating surface region, means for generating a tracking error signal from signals from the first multiple-part split photoreceptor element; means for generating a focus error signal from signals from the two second multiplepart split photoreceptor elements; and means for performing a tracking control and a focus control based on the tracking error signal and the focus error signal, respectively, to record or replay information on the optical information record medium.

26 Claims, 9 Drawing Sheets

FIG. 2A
PLAN VIEW

FIG. 2B
CROSS SECTIONAL VIEW

FOCUS POSITION

FIG. 10A (PRIOR ART) — FOCUS POSITION

FIG. 10B (PRIOR ART) — FOCUSING ERROR (CLOSE)

FIG. 10C (PRIOR ART) — FOCUSING ERROR (DISTANT)

CLOSE TO DISC     AT FOCUS POSITION     DISTANT FROM DISC

APPARATUS FOR RECORDING AND REPLAYING INFORMATION ON OPTICAL INFORMATION RECORD MEDIUM AND OPTICAL PICKUP

BACKGROUND OF THE INVENTION

1. Field of the Invention

The present invention relates to an apparatus for recording and replaying information on optical information record medium and an apparatus for replaying information on optical information record medium, and more particularly to an optical information record/replay apparatus capable of recording information into and/or replaying recorded information from an optical information record medium using a focus error signal and a tracking error signal generated from reflected light beams from the optical information record medium.

2. Description of the Related Art

An optical information record/replay apparatus is generally provided with an optical head for recording information into a record medium. The optical bead includes an object lens for focusing a light beam radiated from a light source such as a laser. The object lens is configured movable along the optical axis and information track width direction.

The optical information record/replay apparatus detects the focus error signal and tracking error signal in order to actuate the object lens along the optical axis and the information track width direction in response to the signals. A method and apparatus for detecting the focus error and tracking error signals will be briefly explained below with reference to the drawings.

PRIOR ART 1

Figure 8:
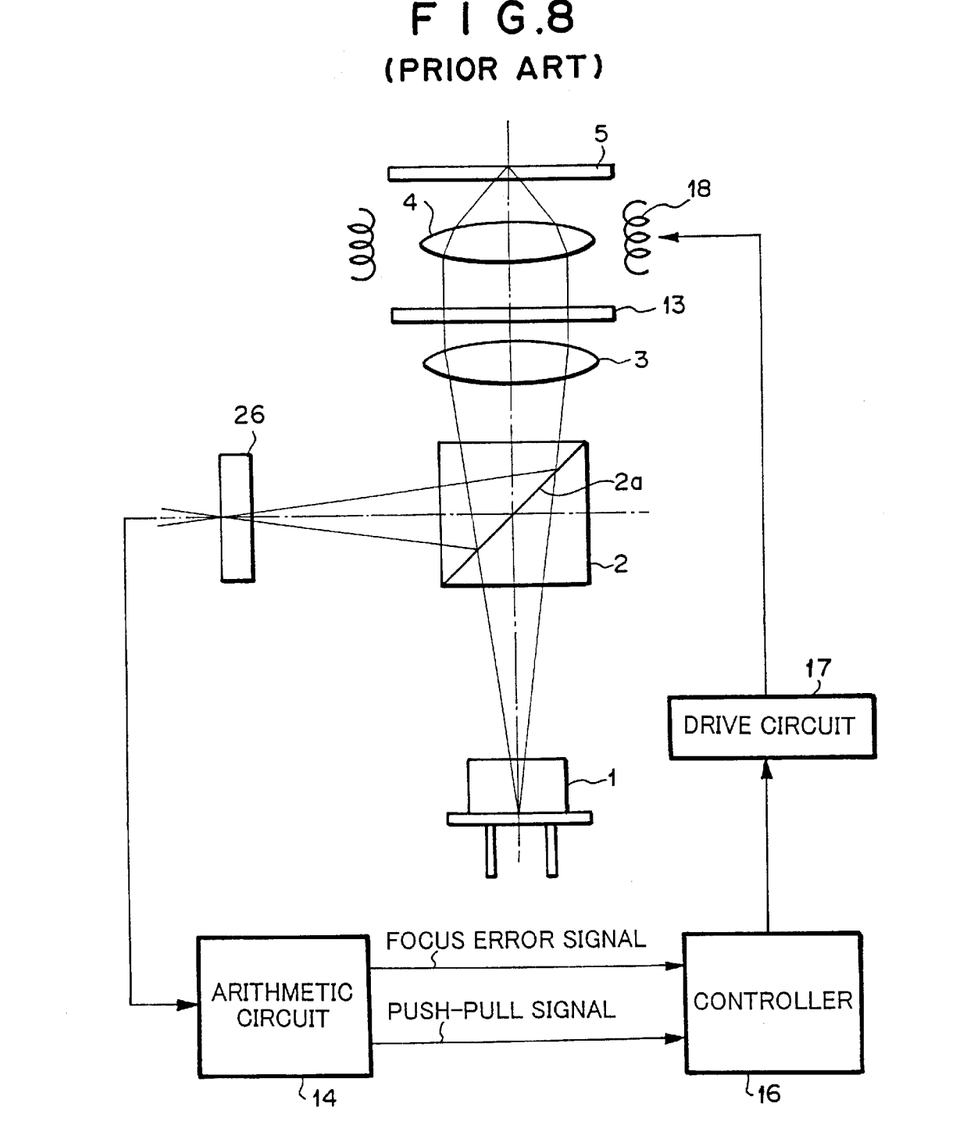
FIG. 8 is a schematic diagram of an optical information record/replay apparatus according to the prior art 1.

FIG. 8 is a diagram showing an optical information record/replay apparatus according to the prior art 1. A light source or laser diode 1 radiates a laser light, which enters a deflection beam splitter 2 onto a deflection surface 2a as a P-wave straight polarized light with respect to the polarization surface of the deflection beam splitter 2. Therefore, it mostly passes through the deflection surface 2a and enters a collimator lens 3.

The collimator lens 3 converts an incident laser light into a parallel light. The parallel light becomes a circular polarized light when it passes through a λ/4 plate 13, and then enters an object lens 4. The object lens 4 collects incident laser lights to form a small spot on an information-bearing surface of an optical disc 5.

Figure 9:
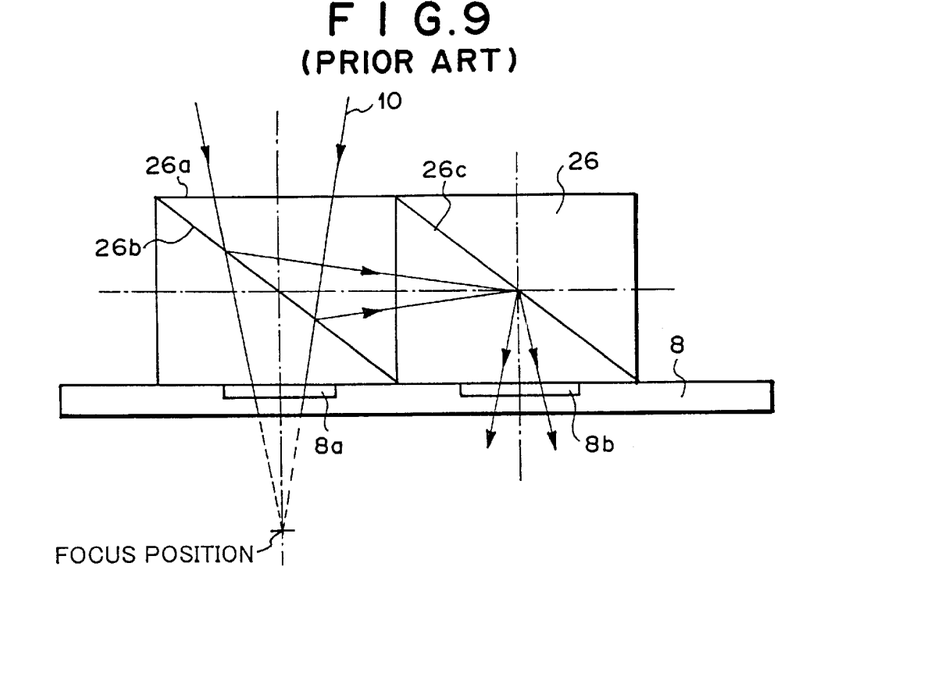
FIG. 9 is a diagram showing a complex prism and photodiode in the optical information record/replay apparatus of FIG. 8.

Referring also to FIG. 9, light 10 reflected at the information-bearing surface of the optical disc 5 enters the deflection beam splitter 2 through the object lens 4, λ/4 plate 13 and collimator lens 3. The reflected light is converted into an S-wave straight polarized light at the λ/4 plate 13. Therefore, it almost reflects at the deflection surface 2a of the deflection beam splitter 2 and enters a complex prism 26.

The complex prism 26 diffract the reflected light into two diffracted light beams as described later. Each diffracted light beam is radiated to a predetermined position of a photodiode substrate including photodiodes or photoreceptor elements (not depicted).

The photodiode receives the reflected light from the optical disc 5 and outputs an optical signal to an arithmetic circuit 14. The arithmetic circuit 14 generates a focus error signal and a tracking error signal from the optical signal and outputs them to a controller circuit 16. A drive circuit 17 supplies a drive current into a magnetic coil in a lens actuator 18. The lens actuator 18 controls the object lens 4 to drive along the focus and tracking directions.

The complex prism 26 and photodiode substrate 8, will be described next using FIGS. 9 and 10A–10C. FIG. 9 is a schematic diagram of the complex prism 26 and photodiode substrate 8. The complex prism 26 and photodiode substrate 8 are positioned at predetermined positions and fixed with a UV setting adhesive and the like.

Figure 10A:
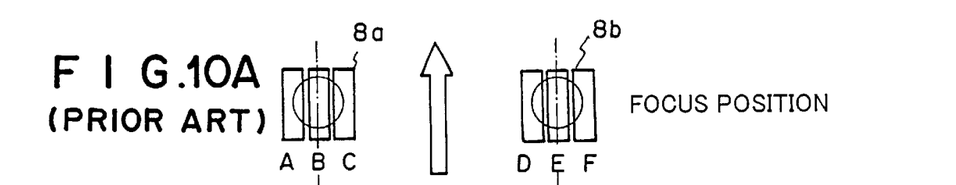
FIGS. 10A–10C are monitor diagrams of the light spot detected at the photodiode of FIG. 9.
Figure 10B:
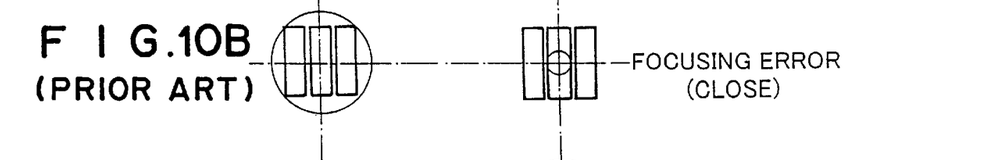
Figure 10C:
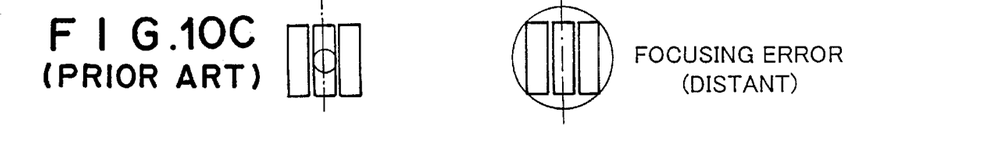

FIGS. 10A–10C are diagrams obtained from monitoring the reflected light detected at photodiodes 8a and 8b. The six-part split photodiodes 8a and 8b consist of respective photodiodes A–F.

When the small spot on the optical disc 5 is located at the focus position on the information-bearing surface of the optical disc, the reflected light from the optical disc 5 enters a surface 26a of the complex prism 26 so as to converge upon a focus point FP in the diagram.

50% of the incident reflected light 10, for example, enters the photodiode 8a without being reflected from the surface 26b of the complex prism 26. The other 50% on the other hand reflects from the surface 26b of the complex prism 26 at about a right angle and then reflects at a surface 26c and enters the photodiode 8b.

If a distance relation between the optical disc 5 and the object lens 4 is a desired value, light spots detected at the photodiodes 8a and 8b are monitored as spots having the same diameters as shown in FIG. 10A.

If a distance between the optical disc 5 and the object lens 4 is shorter than the desired value, a spot diameter of the light spot detected at the photodiode 8a becomes larger and a spot diameter of the light spot detected at the photodiode 8b becomes smaller as shown in FIG. 10B.

If a distance between the optical disc 5 and the object lens 4 is longer than the desired value, the spot diameter of the light spot detected at the photodiode 8a becomes smaller and the spot diameter of the light spot detected at the photodiode 8b becomes larger as shown in FIG. 10c.

When the track advancing direction of the optical disc 5 is as represented by an arrow in FIG. 10, the focus signal can be detected by a spot size method and the track signal can be detected by a push-pull method. Arithmetic equations for use in detection are shown below:

Focus signal=$(A+C+E)-(B+D+F)$

Track signal=$(A+F)-(C+D)$

PRIOR ART 2

Figure 11:
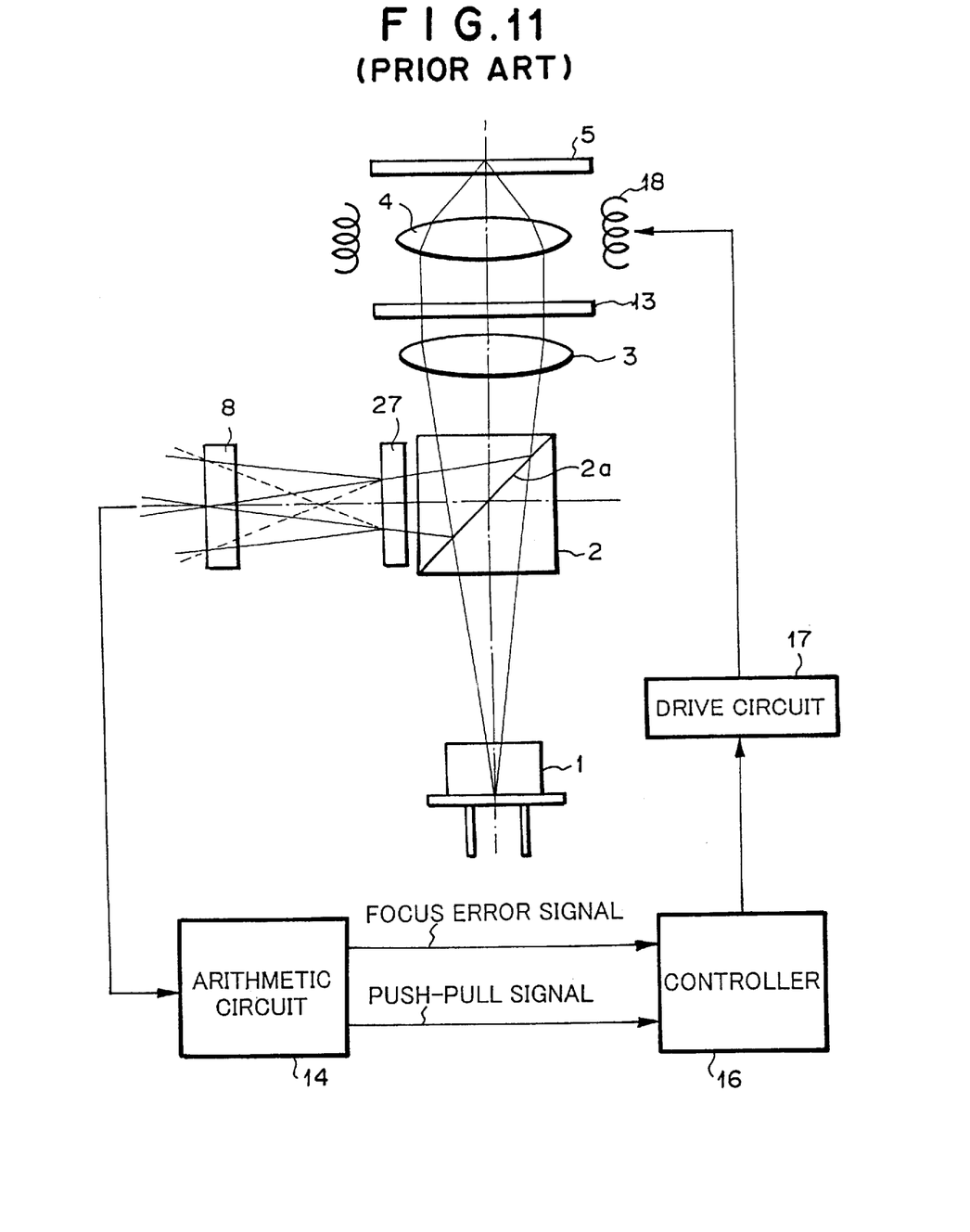
FIG. 11 is a schematic diagram of an optical information record/replay apparatus according to the prior art 2.
Figure 12:
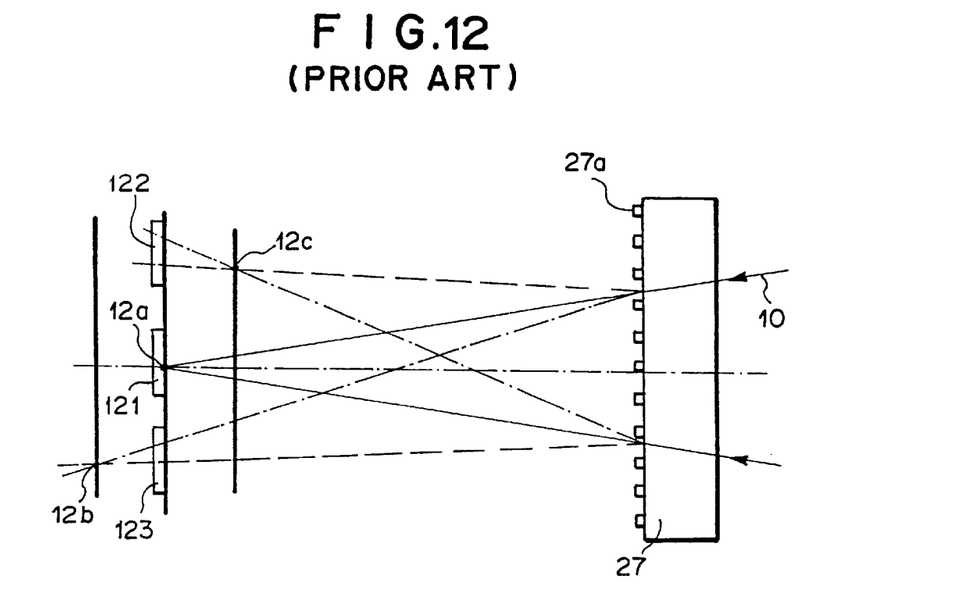
FIG. 12 is a diagram showing a reflected light advancing on a light path when the reflected light enters the hologram device shown in FIG. 1 1.
Figure 13A:
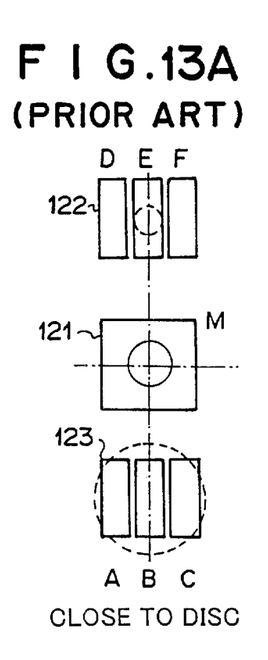
FIGS. 13A–13C are monitor diagrams of the light passing through the hologram device shown in FIG. 12 detected by the photodiode.
Figure 13B:
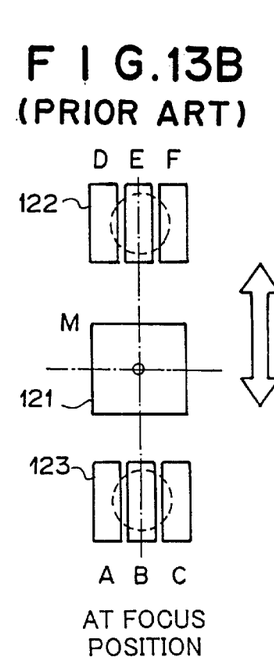
Figure 13C:
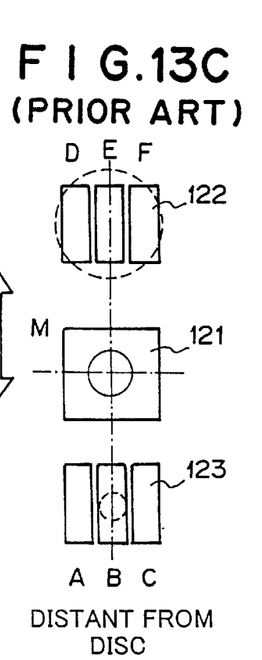

The prior art 2 will be described next using FIGS. 11–13C. FIG. 11 is a diagram showing an optical information record/replay apparatus according to the prior art 2. This optical information record/replay apparatus comprises a grating hologram device 27 and a photodiode substrate 8. FIG. 12 is a diagram showing reflected light in a state of entering the grating hologram device 27. FIGS. 13A–13C are monitor diagrams of the reflected light received at the photodiode 8. Other parts of the optical information record/replay apparatus shown in FIG. 11 are similar to those in the prior art 1.

A hologram grating surface 27a is formed on a surface of the hologram device 27. The hologram grating surface 27a has a grating pattern provided with the following lens power characteristic.

The reflected light 10 from the optical disc 5 is diffracted at the hologram grating surface 27a into three diffracted light beams having a predetermined angle of diffraction. A diffracted light beam of plus first order is characteristically converged upon a near location (close to the hologram surface) relative to a convergence position 12a of a diffracted light beam of zero order that passes through the hologram. A diffracted light beam of minus first order is characteristically converged upon a distant location (apart from the. hologram surface) relative to the convergence position 12a.

When the reflected light 10 enters the hologram grating surface 27a, it is diffracted at the hologram grating surface 27a into three diffracted light beams including a diffracted light beam of plus first order, a diffracted light beam of zero order and a diffracted light beam minus first order. The diffracted light beams are converged upon the positions 12c, 12a and 12b, respectively In this case, a photodiodes 121, 122, 123 are arranged so as to meet its photoreceptor surface with the position 12a.

The photodiode substrate comprises a seven-part split photodiode. The seven-part split photodiode includes a three-part split diode 123 consisting of photodiodes A–C, three-part split diode 122 consisting of photodiodes D–F, and photodiode 121 consisting of a photodiode M.

A diameter of the light spot varies in accordance with a distance relation between the optical disc 5 and the object lens 4. If a distance between the optical disc 5 and the object lens 4 is a desired value, a spot diameter of the light spot detected at the photodiode 123 becomes the same as a spot diameter of the light spot detected at the photodiode 122 as shown in FIG. 13B. If a distance between the optical disc 5 and the object lens 4 is shorter than a desired value, the spot diameter of the light spot detected at the photodiode 123 becomes larger and the spot diameter of the light spot detected at the photodiode 122 becomes smaller as shown in FIG. 13A.

If the distance between the optical disc 5 and the object lens 4 is longer than the desired value, the spot diameter of the light spot detected at the photodiode 123 becomes smaller and the spot diameter of the light spot detected at the photodiode 122 becomes larger as shown in FIG. 13C.

When the track advancing direction of the optical disc 5 is as represented by an arrow in FIG. 13, the focus signal can be detected by a spot size method and the tracking error signal can be detected by a push-pull method with the following arithmetic equations:

Focus signal=$(A+C+E)-(B+D+F)$

Track signal=$(A+F)-(C+D)$

The above conventional technologies, however, have several disadvantages. The optical information record/replay apparatus in the prior art detects the tracking error signal by the push-pull method. The tracking error signal, however, cannot be detected from a replay-only optical disc such as a DVD-ROM but by a detecting method named DPD (Differential Phase Detection) method. It is because a DVD-RAM which is the objective recording medium of the prior art has a groove for the tracking using a push-pull signal, whereas a DVD-ROM has pits for the tracking using a differential phase detection signal (DPD signal). Therefore, the conventional optical information record/replay apparatus cannot replay information recorded in DVD-ROMs.

In addition, the optical information record/replay apparatus in the prior art detects the focus error signal and tracking error signal from the same photodiodes. Therefore, the split lines for the photodiodes A, B and C (or D, E and F) are required to set parallel to the track advancing direction. As a result, crosstalk effecting from the tracking error signal to the focus error signal causes a large disadvantage.

The spot size method, which is the method of detecting the focus signal, generally has a low sensitivity for detecting focus errors and is difficult, to control the operation of the optical head with a high precise resolution.

The optical information record/replay apparatus shown in the prior art 1 includes the complex prism for use in the optical head. The complex prism is expensive. Therefore, it is difficult to lower the cost of the optical information record/replay apparatus having the optical head with the complex prism.

SUMMARY OF THE INVENTION

In order to overcome the above disadvantages, the present invention has been made and accordingly, has an object to provide an optical information record/replay apparatus capable of replaying any optical information record media regardless of types and inexpensively performing a high precise control with less crosstalk. The present invention has another object to provide an optical information replay apparatus capable of replaying any optical information record media regardless of types and inexpensively performing a high precise control with less crosstalk.

According to a first aspect of the present invention, there is provided an apparatus for recording and replaying information on optical information record medium, comprising: a light source for radiating a light beam to an information-bearing layer of the optical information record medium; a hologram device for splitting reflected light from the optical information record medium, the hologram device comprising a central region formed at the central area thereof and a hologram grating surface region arranged at the outer periphery of the central region; a photorecentor device for receiving split light beams from the hologram device, the photoreceptor device comprising a first multiple-part split photoreceptor element for receiving light beams from the central region and two second multiple-part split photoreceptor elements for receiving light beams from the hologram grating surface region, means for generating a tracking error signal from signals from-the first multiple-part split photoreceptor element; means for generating a focus error signal from signals from the two second multiple-part split photoreceptor elements; and means for performing a tracking control and a focus control based on the tracking error signal and the focus error signal, respectively, to record or replay information on the optical information record medium.

According to a second aspect of the present invention, there is provided an apparatus for replaying information on optical information record medium, comprising: a light source for radiating a light beam to an information-bearing layer of the optical information record medium; a hologram device for splitting reflected light from the optical information record medium, the hologram device comprising a central region formed at the central area thereof and a hologram grating surface region arranged at the outer periphery of the central region; a photoreceptor device for receiving split light beams from the hologram device, the photoreceptor device comprising a first multiple-part split photoreceptor element for receiving light beams from the central region and two second multiple-part split photoreceptor elements for receiving light beams from the hologram grating surface region, means for generating a tracking error signal from signals from the first multiple-part split photoreceptor element; means for generating a focus error signal from signals from the two second multiple-part split photoreceptor elements; and means for performing a tracking control and a focus control based on the tracking error signal and the focus error signal, respectively, to replay information on the optical information record medium.

According to a third aspect of the present invention, there is provided an optical pickup, comprising: a light source for radiating a light beam to an information-bearing layer of the optical information record medium; a hologram device for splitting reflected light from the optical information record medium, the hologram device comprising a central region formed at the central area thereof and a hologram grating surface region arranged at the outer periphery of the central region; a photoreceptor device for receiving split light beams from the hologram device, the photoreceptor device comprising a first multiple-part split photoreceptor element for receiving light beams from the central region and two second multiple-part split photoreceptor elements for receiving light beams from the hologram grating surface region.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which.

DETAILED DESCRIPTION OF THE PREFERRED EMBODIMENTS

Embodiments of the present invention will be described with reference to the drawings.

FIRST EMBODIMENT

Figure 1:
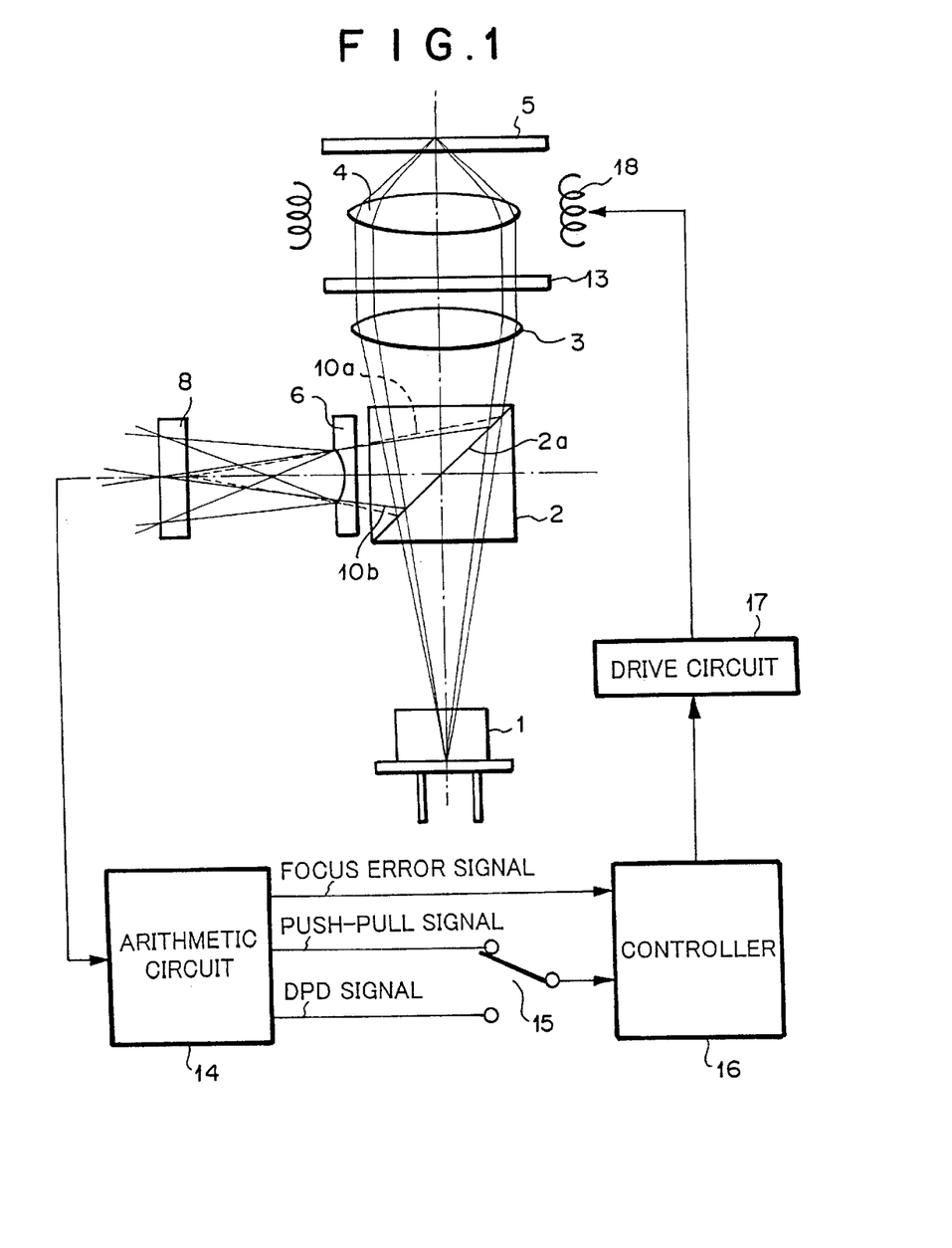
FIG. 1 is a schematic diagram of an optical information record/replay apparatus according to an embodiment of the present invention.

An optical information record/replay apparatus according to the first embodiment will be described first with reference to FIG. 1. FIG. 1 is a general diagram showing an arrangement of the optical information record/replay apparatus of the first embodiment. The apparatus comprises a light source or laser diode 1, a deflection beam splitter 2 for deflecting a light beam radiated from the laser diode 1, a collimator lens 3 for converting the polarized light beam from the deflection beam splitter 2 into parallel light beams, a λ/4 plate 13 for converting the parallel light beam from the collimator lens 3 into a circular polarized light beam, and an object lens 4 for focusing the light beam passed through the λ/4 plate 13 onto an optical disc 5.

The apparatus further comprises a hologram device 6 for converting the reflected light from the optical disc 5, a photodiode substrate 8 including photodiodes, an arithmetic circuit 14 for generating a focus error signal and a tacking error signal on the basis of the light received at the photodiodes, a switch 15 for switching a tracking error signal output from the arithmetic circuit 14, a controller 16 for controlling an intensity of a drive current to drive the object lens 4, and a drive circuit 17 for supplying a drive current to a lens actuator 18 to drive the object lens 4.

The light source or laser diode 1 radiates a laser light beam. The laser light beam enters the deflection beam splitter 2 onto a deflection surface 2a as a P-wave straight polarized light beam. Therefore, it mostly passes through the deflection surface 2a and enters a collimator lens 3.

The collimator lens 3 converts the incident laser light beam into parallel light beams. The parallel light beams become the circular polarized light beam when they pass through the λ/4 plate 13, and then enter the object lens 4. The object lens 4 collects incident laser light beams to form a small spot on an information-bearing surface of the optical disc 5. Light reflected at the information-bearing surface of the optical disc 5 enters the deflection beam splitter 2 through the object lens 4, λ/4 plate 13 and collimator lens 3. The reflected light is converted into an S-wave straight polarized light at the λ/4 plate 13. Therefore, it mostly reflects at the deflection surface 2a of the deflection beam splitter 2 and enters the hologram device 6. The reference numerals 10a and 10b denote reflected light beams passing through the central region of the hologram device 6 and reflected light beams passing through other regions than the central region.

The hologram device 6 is a device having gratings. The reflected light is split into diffracted light beams by the hologram device 6. Each diffracted light beam is radiated as a spotlight at a predetermined position on the photodiode substrate 8 having photodiodes or photoreceptor elements.

The photodiode receives the spotlight as an optical signal. The received optical signal is converted into an electrical signal and output to the arithmetic circuit 14. The arithmetic circuit 14 generates the focus error signal and the tracking error signal from the input electrical signal. The error signals are output to the controller 16. The controller 16 controls a current intensity of the drive current output to the drive circuit 17 based on the error signals.

The switch 15 selects one of tracking error signals to be output to the controller 16. The switch 15 switches a path to a push-pull signal side at the time of recording and replaying information on DVD-RAM. It also switches the path to a DPD signal side at the time of replaying information recorded in the read-only optical disc such as DVD-ROM.

The drive circuit 17 injects a drive current into a magnetic coil of the lens actuator 18. The lens actuator 18 controls the object lens 4 to drive along the focus and tracking directions.

The DPD (Differential Phase Detection) method means such a method that employs photodiodes split into four with respect to the tracking direction and a split line orthogonal thereto. The method detects a focus error signal and a tracking error signal from phase differences between spotlight beams received at each of photodiodes when a laser beam is radiated to pre-pits (protruded pits) of the optical disc 5.

Figure 2A:
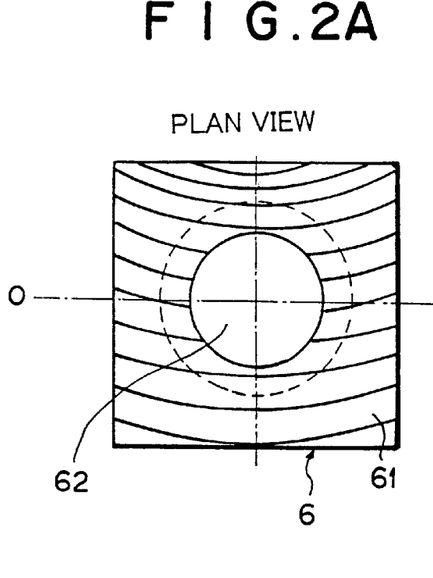
FIG. 2A is a plan view of a hologram device in a first embodiment.
Figure 2B:
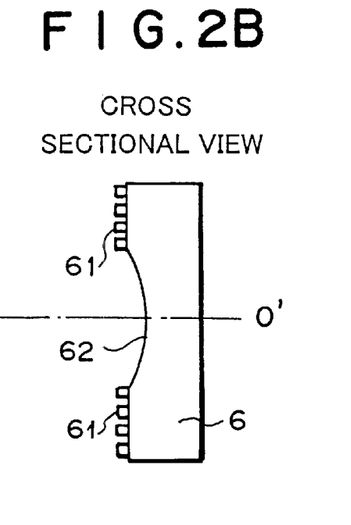
FIG. 2B is a cross sectional view of the hologram device in the first embodiment.

The hologram device 6 will be explained with reference to FIGS. 2A and 2B. FIGS. 2A land 2B are a plan view and a cross sectional view of the hologram device 6, respectively. The hologram device 6 has a spherical region 62 formed on one surface with a predetermined central point on the optical axis 0–0' to form a concave lens and also has a hologram grating surface region 61 formed at the outer periphery thereof. The other surface is an incident surface 63 for incident reflected light beams 10a and 10b.

In FIG. 2A, a circular continuous line indicates a boundary line between the spherical region 62 and the hologram grating surface region 61. A region surrounded by the circular continuous line and a circular dotted line indicates a part of the hologram grating surface region 61, through which the reflected light 10a passes as described later. Curved lines in the drawing represent grating patterns of the hologram grating surface region.

The hologram device 6 consists of a plate of transparent glass substrate, for example, of which central portion is lapped to remove spherically so that the reflected light beams converge upon a more backward point than the original convergence position with a lens power by the spherical surface. The hologram grating surface region 61 is formed at the outer periphery of the spherical region 62 by a photoresist method and the like. The hologram device 6 may be a glass mold or molded in one piece with plastic and the like.

The spherical region 62 is desirably sized as large as possible within a range that does not affect the focus error signal. In other words, the spherical region 62 is desirably sized as large as possible as long as the focus error signal from a part in the hologram grating surface region 61 can be obtained. More definitely, the size of the spherical region 62 is enough to ensure 60–80% area of the diameter of the reflected light beam.

Figure 3:
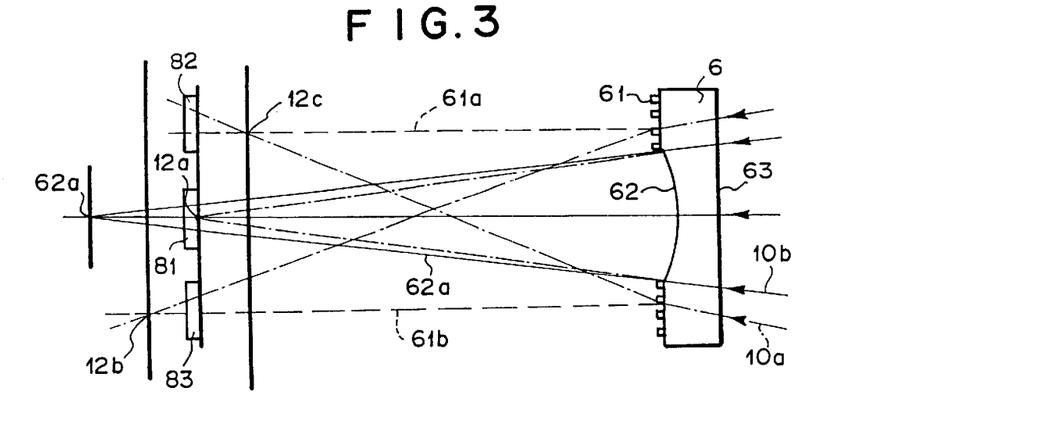
FIG. 3 is a diagram showing reflected light advancing on a light path when the reflected light enters the hologram device shown in FIGS. 2A–2B.

Paths of reflected light beams when the reflected light beams from the optical disc 5 enter the hologram device 6 will be described next with reference to FIG. 3. The reflected light beams 10a and 10b from the optical disc 5 are controlled to enter the incident surface 63 of the hologram device. 6.

Among the reflected light beams, the reflected light beam 10b converges upon a point 62a distant from the hologram device 6 relative to the original convergence point 12a because of the lens power as described above.

The reflected light beam 10a passing through the hologram grating surface region 61 is diffracted at the hologram grating. The diffracted light beam of plus first order 61a converges upon a point 12c and the diffracted light beam of minus first order 61b converges upon a point 12b. The diffracted light beam of zero order, which might have passed through the hologram grating surface region 61 and affected the convergence position, is prevented from being generated by setting a depth of the hologram gratings optimally.

The photo-receiving surface of the photodiode has a ten-part split pattern. A spot shape of the reflected light monitored at each photodiode varies in response to a focus error amount of the optical disc 5. A spot position of the reflected light monitored at each photodiode varies in response to a tracking error amount of the optical disc 5.

The split pattern of the photodiode is not limited to the ten-part split. Other patterns capable of obtaining either the push-pull signal and DPD signal can also be employed.

Figure 4A:
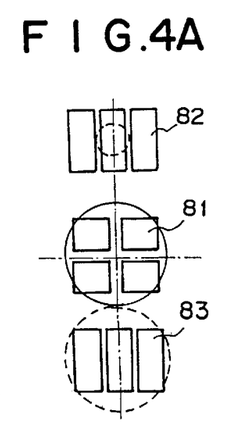
FIGS. 4A–4C are diagrams showing a light spot monitored at photodiodes when the reflected light shown in FIG. 3 is received.

Variations of the spot shape will be described with reference to FIGS. 4A–4C which are monitor diagrams of a case of radiating the reflected light from the optical disc (FIG. 1) to the photodiode consisting of the ten-part split pattern (A–J). The reference numerals 82 and 83 denote three-part split photodiodes respectively having photodiodes E–G and H–J, and the reference numeral 81 denotes a four-part split photodiode with photodiodes A–D. Photodiodes 81, 82, 83 are located as shown in FIG. 3.

The three-part split photodiodes 82 and 83 receive the diffracted light beams of plus/minus first orders passing through the hologram grating surface region 61 and detect light beams for the focus error signal. The four-part split photodiode 81 receive the light passing through the spherical region 62 and detect light beams for the tracking error signal.

Figure 4B:
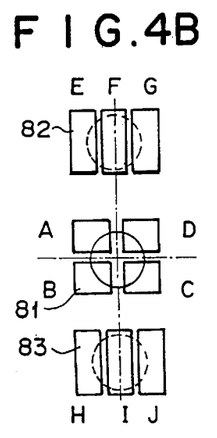
Figure 4C:
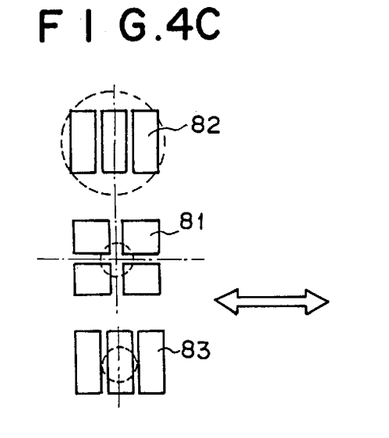

If a distance between the optical disc 5 and the object lens 4 (both shown in FIG. 1) is a desired distance, the diffracted light beams of plus/minus first orders, which pass through the hologram grating surface region 61, are monitored to have the same spot diameters on the threepart split photodiodes 82 and 83 as shown in FIG. 4B.

If the distance between the optical disc 5 and the object lens 4 is not the desired distance, the spotlight beams passed through the hologram grating surface region 61 cause errors on the focus positions. Thus, the spot diameters monitored at the three-part split photodiodes 82 and 83 vary: one becomes larger and the other smaller.

Definitely, if the distance between the optical disc 5 and the object lens 4 is shorter, the light spot monitored at the photodiode 83 becomes larger and the light spot monitored at the photodiode 82 becomes smaller as shown in FIG. 4A. On the other hand, if the distance between the optical disc 5 and the object lens 4 is longer, the light spot monitored at the photodiode 83 becomes smaller and the light spot monitored at the photodiode 82 becomes larger as shown in FIG. 4C. Thus, sizes of the light spots to be monitored may alternate in accordance with the long/short distance between the optical disc 5 and the object lens 4.

The diameter of the spotlight passed through the spherical region 62 depends on the distance between the optical disc 5 and the object lens 4: the shorter the distance, the larger the diameter; and the longer the distance, the smaller the diameter.

The focus error signal and tracking error signal are generated at the arithmetic circuit 14 (FIG. 1) in accordance with the following arithmetic equations. The track advancing direction of the optical disc 5 is as represented by an arrow in FIG. 4C. The track advances in the direction perpendicular to the split direction of the photodiodes.

Focus signal=$(E+G+I)-(H+J+F)$

Track signal (push-pull signal)=$(A+D)-(B+C)$

Track signal (DPD signal)=$(A+C)-(B+D)$

The push-pull signal is selected in the switch 15 when recording or replaying information on an optical disc which has a groove such as a DVD-RAM. On the other hand, the DPD signal is selected in the switch 15 when replaying information on an optical disc which has pits such as a DVD-ROM.

Second Embodiment

An optical information record/replay apparatus according to the second embodiment will be described next with reference to FIG. 5. The optical information record/replay apparatus according the second embodiment is configured to include the same components as those of the optical information record/replay apparatus shown in FIG. 1 except for a hologram device 7 replacing hologram device 6.

Figure 5A:
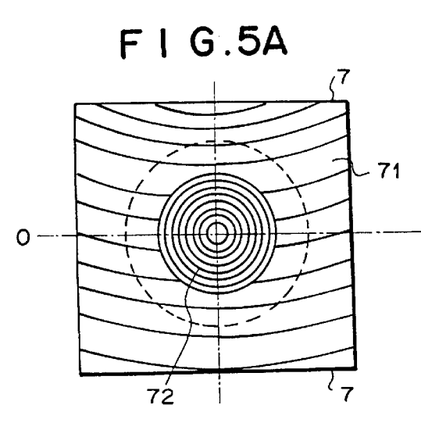
FIG. 5A is a plan and cross sectional view of a hologram device in a second embodiment.
Figure 5B:
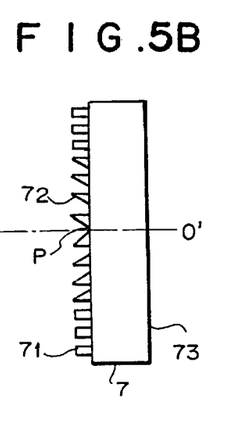
FIG. 5B is a cross-sectional view of the hologram device in the second embodiment.

FIGS. 5A and 5B are a plan view and a cross sectional view of the hologram device 7, respectively. The hologram device 7 has a concentric hologram grating region 72 formed on one surface with a predetermined central point on the optical axis 0–0' and also has another hologram grating surface region 71 formed at the outside thereof. The other surface is an incident surface 73 for the incident reflected light beams 10a and 10b.

In FIG. 5A, a circular continuous line indicates a boundary line between the concentric hologram grating region 72 and the hologram grating surface region 71. A region surrounded by the circular continuous line and a circular dotted line indicates a part of the hologram grating surface region 71, through which the reflected light beam 10b passes as described later. Curved lines in the drawing represent grating patterns of the hologram grating surface region.

The hologram device 7 consists of a plate of transparent glass substrate, for example, and the concentric hologram grating region 72 is formed on the central portion of the substrate. The hologram grating surface region 71 is formed on the outside of concentric hologram grating region 72 by a photoresist method and the like. The hologram device 7 may be a glass mold or molded in one piece with plastic and the like.

The concentric hologram grating region 72 has a blade-shaped (saw-toothed) cross section as shown in FIG. 5B and diffracts a received reflected light beam into three diffracted light beams: a diffracted light beam of plus first order; a diffracted light beam of zero order; and a diffracted light beam of minus first order. The diffracted light beam of plus first order is diffracted with a high efficiency, and the diffracted light beams of minus first and zero orders, which affect the convergence position, are diffracted with low efficiencies.

Figure 6:
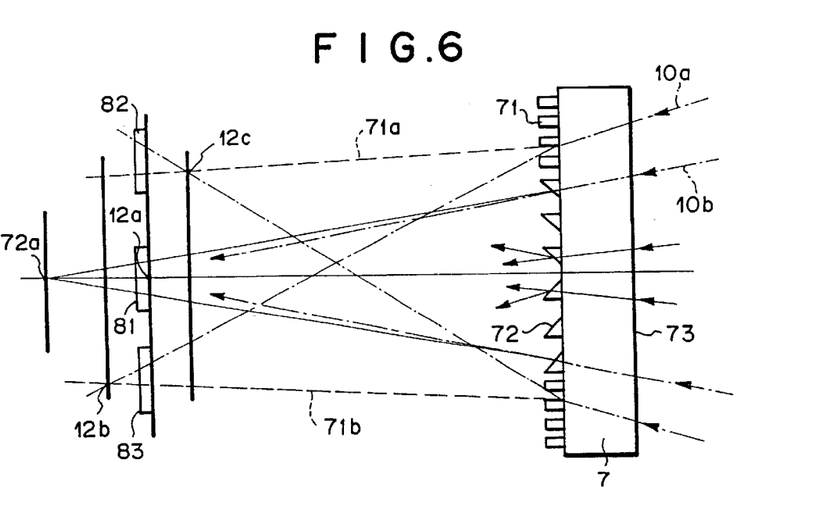
FIG. 6 is a diagram showing reflected light advancing on a light path when the reflected light enters the hologram device shown in FIGS. 5A–5B.

Paths of reflected light beams 10a and 10b when the reflected light beams from the optical disc 5 enter the hologram device 7 will be described next with reference to FIG. 6. The reflected light beams 10a and 10b from the optical disc Sare controlled to enter an incident surface 73 of the hologram device 7.

Among the reflected light beams, the reflected light beam 10b passing through the concentric hologram grating region 72 converges upon a point 72a distant from the hologram device 7 relative to the original convergence point 12a because of the lens power caused from the concentric hologram.

The reflected light beam 10a passing through the hologram grating surface region 71 is diffracted at the hologram grating. The diffracted light beam of plus first order 71a converges upon a point 12c and the diffracted light beam of minus first order 71b converges upon a point 12b. The diffracted light of zero order, which might have passed through the hologram grating surface region 71 and affected the convergence position, can be prevented from being caused by setting a depth of the hologram gratings optimally.

The photo-receiving surface of the photodiode has the same ten-part split pattern as described in the first embodiment. A spot diameter of the reflected light beam radiated to the photo-receiving surface of the photodiode varies in response to a focus error amount of the optical disc 5.

The change of the distance between the optical disc 5 and the object lens 4 changes a light spot diameter of the reflected light beam monitored at the photodiode similar to the first embodiment.

The light spots of the reflected light beams monitored at the photodiodes 82 and 83 for detecting light beams for the focus error signal are diffracted at the hologram devices 6, 7 and converge on the photodiodes. The hologram devices 6 and 7 have the spherical region 62 and the like formed at their central portions. Thus, the light spots passing through the hologram devices 6 and 7 become ring shaped spots of which central portions are opaque.

The reflected light beam of which central portion is opaque can converge upon the photodiode as a smaller spot than that in a normal state (not shielded). On the other hand, a light beam with a high intensity at the central portion can be obtained at a location other than the convergence position due to the diffraction phenomenon.

Figure 7A:
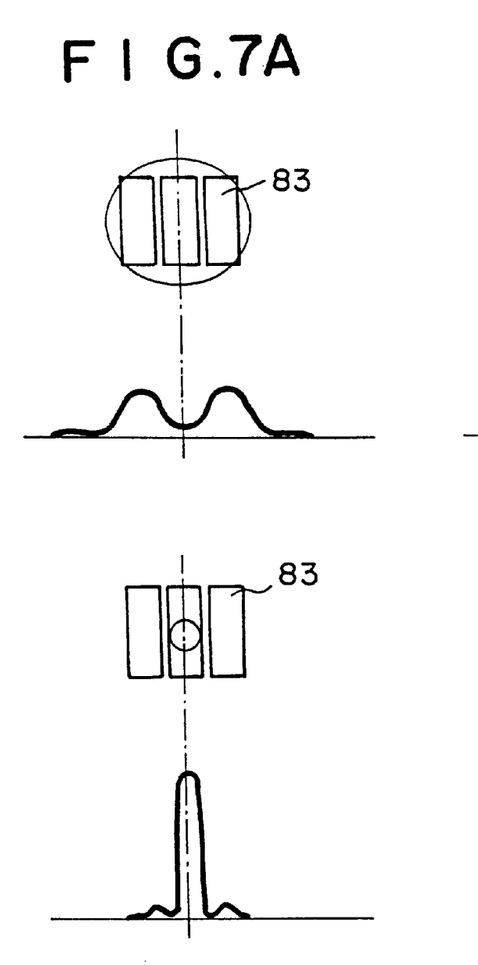
FIG. 7A is a diagram of an intensity distribution of the light spot detected in the embodiment of the present invention.
Figure 7B:
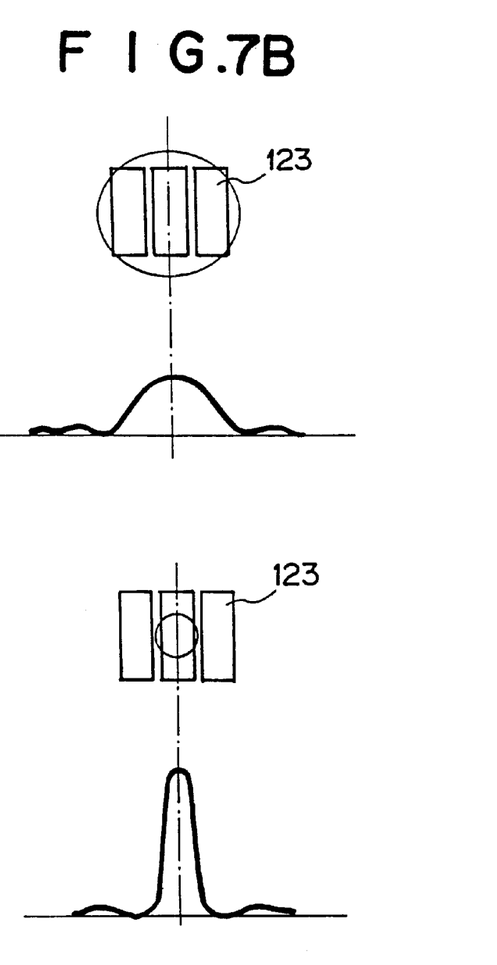
FIG. 7B is a diagram of an intensity distribution of the light spot detected in a prior art.

FIG. 7A is a diagram illustrating variations of an intensity distribution of the spotlight monitored at the photo-receiving surface of the photodiodes 82, 83 shown in the first and second embodiments, and FIG. 7B is a diagram illustrating variations of an intensity distribution of the spotlights monitored at the photo-receiving surface of the photodiodes 122, 123 of a comparative example, for instance, the optical information record/replay apparatus in the prior art 2.

The spotlight monitored at the photodiode in the prior art 2 and the like has a spot diameter in the convergence state not smaller than a desired size as shown in FIG. 7B. In addition, the central portion of the spotlight has an intensity not higher than a desired intensity. In the divergence state, the spot diameter becomes larger but the intensity at the central portion of the spotlight does not lower sufficiently.

On the other hand, the spotlight monitored at the photodiode in the first and second embodiments has a small spot diameter due to the so-called super-resolution phenomenon as shown in FIG. 7A and the central portion of the spotlight has a high intensity. In the divergence state, the spot diameter becomes larger and the intensity at the central portion of the spotlight becomes lower. Accordingly, a higher sensitivity for the focus signal than that of the comparative example can be obtained.

The reflected light passing through the spherical region 62 and the like becomes a far field state on the photodiode 81 and the tracking error signal can be detected from a fluctuation of a beam intensity distribution.

A ratio of the diameter of the spherical region 62 and the like in the hologram devices 6,7 to the diameter of the reflected beam entering the hologram devices 6,7 from the optical disc 5 can be freely set from, for example, an optical magnification for detection, NA of the reflected beam and pattern widths of the three-part split photodiodes 82, 83.

The optical information record/replay apparatus of the present invention comprises a hologram device consisting of a central region and the like formed at the central area and a hologram grating surface region arranged at the outer periphery of the central region. The apparatus also comprises such a photoreceptor device consisting of split patterns that can detect light beams for the focus error signal and tracking error signal from the optical record medium capable of recording information therein and replaying recorded information therefrom. The photoreceptor device can also detect light beams for the focus signal and tracking error signal from the replay-only optical record medium only capable of replaying recorded information. Therefore, the present invention can provide an optical information record/replay apparatus capable of recording information on a DVD-RAM and replaying recorded information from a DVD-RAM and a DVD-ROM.

According to the present invention, there is provided a hologram device consisting of a central region and the like formed at the central area and a hologram grating surface region arranged at the outer periphery of the spherical region. There is also provided such a photoreceptor device consisting of split patterns that can detect light beams for the focus error signal and tracking error signal from the optical record medium capable of recording information therein and replaying recorded information therefrom. The photoreceptor device can also detect light beams for the focus signal and tracking error signal from the replay-only optical record medium only capable of replaying recorded information.

The spot size detection and push-pull detection can be performed independently and the track advancing direction can be arranged orthogonal to the split line direction of the photodiode pattern for the spot size detection. Therefore, the crosstalk effecting from the track signal to the focus signal can be suppressed.

The reflected light beam for detecting focus error signal is shielded at the central portion to decrease the light spot size. In the defocused state, the central portion has a low intensity. Thus, the error detection sensitivity by the spot'size method can be increased.

The present invention employs an inexpensive hologram device instead of an expensive complex prism and thus can provide an inexpensive optical information record/replay apparatus.

Having described the embodiments consistent with the present invention, other embodiments and variations consistent with the present invention will be apparent to those skilled in the art. Therefore, the invention should not be viewed as limited to the disclosed embodiments but rather should be viewed as limited only by the spirit and scope of the appended claims.

What is claimed is:

1. An apparatus for recording and replying information on option information record medium, comprising:
   a light source for radiating a light beam to an information-bearing layer of the optical information record medium;
   a hologram device for splitting reflected light from said optical information record medium, said hologram device comprising a central region formed at the central area thereof and a hologram grating surface region arranged at the outer periphery of said central region;
   a photoreceptor device for receiving split light beams from said hologram device, said photoreceptor device comprising a first multiple-part split photoreceptor element for receiving light beams from said central region and two second multiple-part split photoreceptor elements for receiving light beams from said hologram grating surface region,
   means for generating a tracking error signal from signals from said first multiple-part split photoreceptor element;
   means for generating a focus error signal from signals from said two second multiple-part split photoreceptor elements; and
   means for performing a tracking control and a focus control based on said tracking error signal and said focus error signal, respectively, to record or replay information on the optical information record medium.

2. The apparatus according to claim 1, wherein said central region comprises a concave lens.

3. The apparatus according to claim 1, wherein said central region comprises a spherical grating.

4. The apparatus according to claim 1, wherein said first multi-part split photoreceptor element comprises four parts.

5. The apparatus according to claim 1, wherein each of said two second multiple-part split photoreceptor elements comprises three parts.

6. The apparatus according to claim 1, wherein said central region focuses the reflected light on a point farther than said photoreceptor device.

7. The apparatus according to claim 1, wherein said hologram grating surface region focuses one of the split light beams on a point farther than said photoreceptor and another of the split light beams on a point nearer than said photoreceptor.

8. The apparatus according to claim 1, wherein said means for generating a tracking error signal generates plural types of tracking error signal which are different from each other in term of combination of signals from said first multiple-part split photoreceptor element.

9. An apparatus for replaying information on optical information record medium, comprising:
   a light source for radiating a light beam to an information-bearing layer of the optical
   a hologram device for splitting reflected light from said optical information record medium, said hologram device comprising a central region formed at the central area thereof and a hologram grating surface region arranged at the outer periphery of said central region;
   a photoreceptor device for receiving split light beams from said hologram device, said photoreceptor device comprising a first multiple-part split photoreceptor element for receiving light beams from said central region and two second multiple-part split photoreceptor elements for receiving light beams from said hologram grating surface region,
   means for generating a tracking error signal from signals from said first multiple-part split photoreceptor element;
   means for generating a focus error signal from signals from said two second multiple-part split photoreceptor elements; and
   means for performing a tracking control and a focus control based on said tracking error signal and said focus error signal, respectively, to replay information on the optical information record medium.

10. The apparatus according to claim 9, wherein said central region comprises a concave lens.

11. The apparatus according to claim 9, wherein said central region comprises a spherical grating.

12. The apparatus according to claim 9, wherein said first multi-part split photoreceptor element comprises four parts.

13. The apparatus according to claim 9, wherein each of said two second multiple-part split photoreceptor elements comprises three parts.

14. The apparatus according to claim 9, wherein said central region focuses the reflected light on a point farther than said photoreceptor device.

15. The apparatus according to claim 9, wherein said hologram grating surface region focuses one of the split light beams on a point farther than said photoreceptor and another of the split light beams on a point nearer than said photoreceptor.

16. The apparatus according to claim 9, wherein said means for generating a tracking error signal generates plural types of tracking error signal which are different from each other in term of combination of signals from said first multiple-part split photoreceptor element.

17. An optical pickup, comprising:

a light source for radiating a light beam to an information-bearing layer of the optical information record medium;

a hologram device for splitting reflected light from said optical information record medium, said hologram device comprising a concentric hologram grating region formed at the central area thereof and an outer hologram grating surface region arranged at the outer periphery of said central region;

a photoreceptor device for receiving split light beams from said hologram device, said photoreceptor device comprising a first multiple-part split photoreceptor element for receiving light beams from said central region and two second multiple-part split photoreceptor elements for receiving light beams from said hologram grating surface region.

18. The optical pickup according to claim 17, wherein said first multipart split photoreceptor element comprises four parts.

19. The optical pickup according to claim 17, wherein each of said two second multiple-part split photoreceptor elements comprises three parts.

20. The optical pickup according to claim 17, wherein said central region focuses the reflected light on a point farther than said photoreceptor device.

21. The optical pickup according to claim 17, wherein said outer hologram grating surface region focuses one of the split light beams on a point farther than said photoreceptor and another of the split light beams on a point nearer than said photoreceptor.

22. The apparatus according to claim 1, wherein said central region comprises a concentric hologram grating region.

23. The apparatus according to claim 22, wherein said concentric hologram grating region comprises saw-toothed shaped elements.

24. The apparatus according to claim 9, wherein said central region comprises a concentric hologram grating region.

25. The apparatus according to claim 24, wherein said concentric hologram grating region comprises saw-toothed shaped elements.

26. The optical pickup according to claim 17, wherein said concentric hologram grating region comprises saw-toothed shaped elements.

\* \* \* \* \*

UNITED STATES PATENT AND TRADEMARK OFFICE
CERTIFICATE OF CORRECTION

PATENT NO. : 6,466,526 B1
DATED : October 15, 2002
INVENTOR(S) : Syuuichi Onayama

It is certified that error appears in the above-identified patent and that said Letters Patent is hereby corrected as shown below:

Column 11,
Line 44, "option" should be -- optical --.

Column 12,
Line 28, please add -- information record medium -- after "optical".

Signed and Sealed this

Twenty-second Day of June, 2004

JON W. DUDAS
*Acting Director of the United States Patent and Trademark Office*